Figures 1, 2:
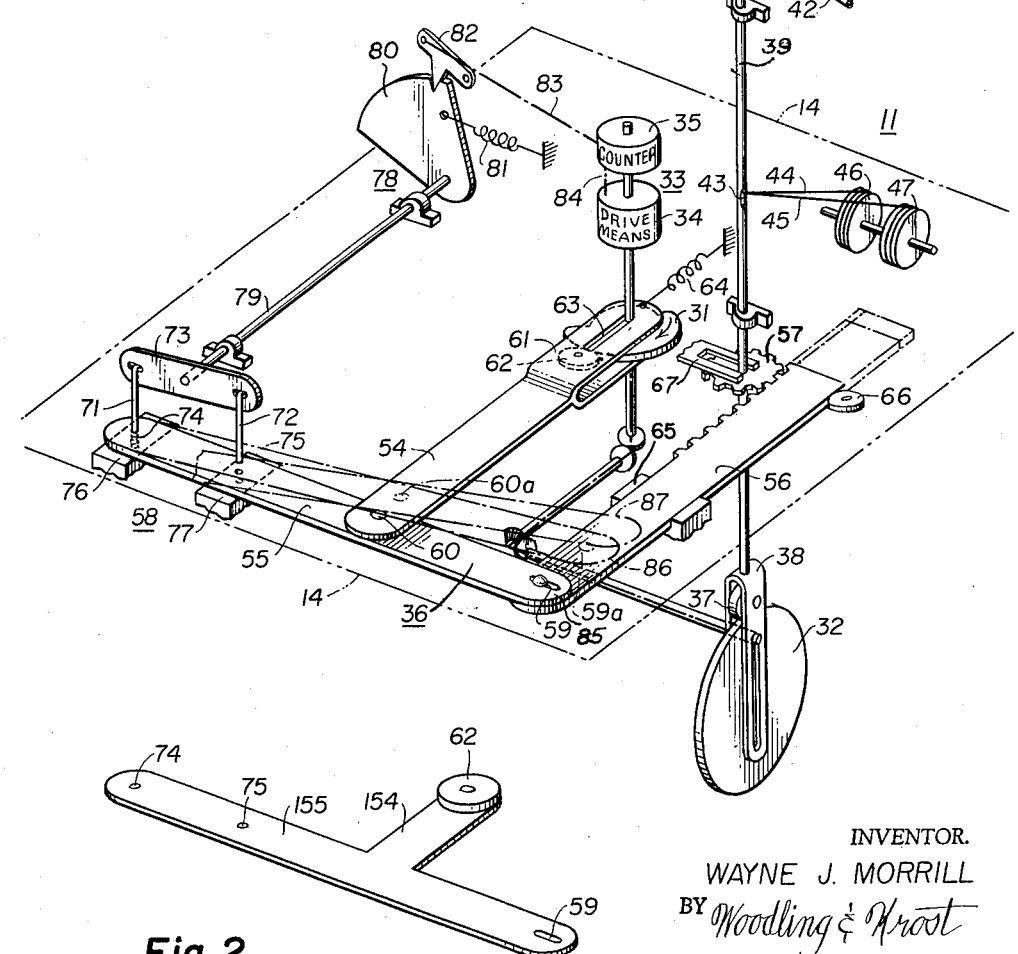

March 12, 1963  W. J. MORRILL  3,081,043
WINDING MACHINE
Filed Dec. 2, 1957

INVENTOR.
WAYNE J. MORRILL
BY Woodling & Krost
ATTORNEYS

United States Patent Office 3,081,043
Patented Mar. 12, 1963

3,081,043
WINDING MACHINE
Wayne J. Morrill, King and Hamsher Sts., Garrett, Ind.
Filed Dec. 2, 1957, Ser. No. 700,138
16 Claims. (Cl. 242—1.1)

The invention relates in general to winding machines and more particularly to a winding machine designed to wind two differently shaped coils.

My prior Patent 2,791,121 issued May 7, 1957, shows a mechanical movement device which may be used for winding a coil, for example, on a dynamoelectric machine to wind the field windings thereof on salient pole pieces. The present machine may also be used to wind coils on pole pieces of a dynamoelectric machine, for example, and has the additional advantage of being able to wind two differently shaped coils.

In certain types of dynamoelectric machines two different sizes or shapes of coils are often used either as armature or field windings; and, as an example, on an induction motor or generator which may be of the shaded pole type, salient pole pieces are provided either on the inner or outer members, which pole pieces may be provided with first and second coils of different sizes. The present invention is directed toward a new machine which will wind first and second coils with only a single common coil side and may also be operated to wind these coils consecutively without stopping the machine between the winding of the first and the second coils.

An object of the invention therefore is to provide a winding machine which may consecutively wind two coils of different sizes and shapes.

Another object of the invention is to provide a winding machine to wind partially overlapping coils with a common coil side.

Another object of the invention is to provide a machine which may wind a coil of a particular configuration and which is provided with a shifter mechanism to change force transmitting points therein so as to change the effective throw of a moving part therein to continue winding without stopping to wind a second coil of a different configuration.

Another object of the invention is to provide a winding machine to consecutively wind first and second coils of different shapes wherein first and second pivots are provided in the machine for a lever, and with these pivots alternatively selectable by a shifter mechanism to change the throw of the lever and thus to change the arcuate movement of a wire guide means so that the machine may wind the second coil of a greater arcuate extent than that of the first coil.

Another object of the invention is to provide a winding machine providing relative movement between a wire guide means and a form on which the coil is to be wound with the relative movement being in two directions, both a reciprocating movement along an axis and an arcuate movement relative to this axis, and with this relative movement establishing first and second different winding paths having a single common portion to wind first and second coils with a single common coil side.

Other objects and a fuller understanding of this invention may be had by referring to the following description and claims, taken in conjunction with the accompanying drawings, in which:

FIGURE 1 is a partially schematic isometric view of a winding machine of the invention; and FIGURE 2 is a partial view of a modification.

The FIGURE 1 shows somewhat diagrammatically a winding machine 11 which is adapted to wind first and second coils 12 and 13, respectively. The machine 11 may have any suitable frame 14 for mounting the various parts and is designed to wind the coils 12 and 13 on a suitable form. In many cases coil winding machines wind coils on a form and then the form itself is placed on the electrical apparatus with which the coil is to be used, and in other cases the coil winding machines wind the coils directly on the electrical apparatus. In such case the electrical apparatus becomes the winding form, and in FIGURE 1, merely for purposes of illustration, the machine 11 has been illustrated as winding coils on a form shown as the outer member or stator 15 of a rotary dynamoelectric machine. This may be an induction motor, for example, of the shaded pole type and in such case the coils 12 and 13 become field windings on salient pole pieces 16 of this stator. The stator 15 has been shown with two pairs of pole pieces although any number may be used, and these pole pieces have pole faces 17 with slots 18 between adjacent pole faces. A winding space 19 is defined between adjacent pole pieces and an annular ring member or yoke 20. The pole pieces have each been provided with a slot 21 in which a coil side of the coil 12 resides.

The winding machine 11, for economy of operation as well as symmetry, may be constructed to wind diametrically opposite coils at the same time, that is, coil 12 and to coil 22 diametrically opposite thereto may be simultaneously wound and a coil 13 and a diametrically opposite coil 23 may next be simultaneously wound. The winding action of the machine 11 is identical with each of the diametrically opposite coils; hence, only one will be described. A common coil side 26 of the coils 12 and 13 is on one side of the pole piece 16. As previously stated, the other coil side of coil 12 is within the slot 21. The other coil side of coil 13 is on the opposite side of the pole piece 16. This makes the coils 12 and 13 partially overlapping coils with the common coil side 26. In the embodiment of the machine 11, as shown, it is designed to wind first the coil 12 and next to wind the coil 13 without shutting down the machine between these two coils of different shapes or configurations.

The stator 15 has an axis 27 which in this case is shown as being vertically disposed, and means is provided, not shown, to support the stator 15 relative to the frame 14. The frame 14 also supports the mechanism which provides the relative movement between the stator 15, as the winding form, and wire guide means 28 in first and second different cyclical winding paths.

The frame 14 carries first and second cams 31 and 32 which are journalled relative to the frame 14 and are driven by motive means 33 which includes a drive means 34 and a counter 35. The first cam 31 is arranged to provide arcuate reciprocating or twisting movement to the wire guide means 28 about the axis 27 through linking means 36. The cam 32 is arranged to provide reciprocating movement along the axis of the wire guide means 28, and the combination of these two cam movements provides the cyclical winding path movement which is a relative movement of the wire guide means 28 and stator 15. The cam 32 bears against a roller cam follower 37 carried in a fork 38 connected to the lower end of a wire feed tube 39. A winding tube 40 is connected generally perpendicularly to an upper end of the feed tube 39 and has first and second ends 41 and 42 which are thin enough to pass up and down through the slots 18 and 21 to guide wire so as to wind the coils 12 and 13, and 22 and 23. An eyelet 43 is provided in the feed tube 39, and wires 44 and 45 from supply reels 46 and 47, respectively, are fed through the eyelet 43, up through the feed tube 39, and out through the ends of the winding tube 40 to wind coils on the winding form.

In FIGURE 1 identical diametrically opposite coils 12 and 22 are shown as already being wound and also identical diametrically opposite coils 13 and 23 are shown as having been previously wound. The machine 11 is shown as being in a position just starting the winding of the remaining pairs of coils yet to be wound on the remaining pole pieces of the stator 15. The ends of the wires 44 and 45 may be held in place by any suitable means and then wire paid out of the winding tube 40 as the ends thereof circumscribe the pole pieces 16 or a portion thereof. About one and one-half turns have been shown as being wound on the alternate pair of pole pieces to form new coils 52 and 53 which will be similar to coils 12 and 22.

The linking means 36 which links the cam 31 and the wire guide means 28 includes generally a link 54, a lever 55, a rack 56, and a pinion 57. The lever 55 may be pivoted to the frame 14 at first pivot means 58, and the lever 55 is connected to the rack 56 by second pivot means 59. A third pivot means 60 may interconnect the link 54 and the lever 55. The link 54 at one end thereof has a fork 61 carrying a cam follower 62 to ride on the cam 31 and the fork 61 may have a slot or similar means 63 straddling the axle of the cam 31 in order to hold the link 54 in place. A spring 64 urges the cam follower 62 against the cam 31.

The rack 56 slides in slide bearings 65 on the frame 14 and meshes with the pinion 57 by cooperation with the back up roll 66. The pinion 57 is journalled for rotation relative to the frame 14, such as by the bearing bracket 67 and this pinion 57 does not move axially. The wire feed tube 39 is slidably keyed to the pinion 57 coaxially thereof so that the two are locked together for rotative movements yet may relatively slide axially.

The first pivot means 58 by which the lever 55 may be pivotally interconnected with the frame 14 includes first and second pivot pins 71 and 72 carried on a yoke or carrier 73 and which selectively may engage pivot holes 74 and 75, respectively, and first and second bearings 76 and 77, respectively, fixed relative to the frame 14. The yoke 73 is part of a shifter mechanism 78 to selectively shift between the first and second pivots 71 and 72, and this shifter mechanism is shown as including an axle 79 keyed to the yoke 73 and keyed to a segment 80. A spring 81 urges the segment 80 clockwise and a latch 82 may be positioned to hold the segment in a counterclockwise limit position whereat the first pivot 71 is effective. The counter 35 is connected by a link 83 to control the latch 82 and may also control the drive means 34 by a link 84. When the latch 82 is tripped, the spring 81 moves the yoke 73 to have the second pivot 72 effective so that the lever 55 will pivot about the second pivot 72 rather than about the first pivot 71.

*Operation*

The winding machine 11 has been shown as slightly expanded for clarity in the drawing and it will be clear that the winding tube 40 need not move physically so far below the pole pieces 16 in order to wind the various coils such as coils 52 and 53. The counter 35 may be of any well-known type which counts a predetermined number of cycles and then, through the link 83, trips the latch 82. Preferably the winding cycles continue until the counter has again counted a predetermined number of cycles whereat, through the link 84, the drive means 34 is stopped. With this sequence of events the machine 11 will wind consecutively a small coil 12 and a larger coil 13 and then shut itself off. The machine may then be easily reset for two more groups of cycles by moving the segment 80 counterclockwise until it is caught by the latch 82.

The drive means 34 drives both cams 31 and 32 in synchronism, and cam 31 is shown in position whereat it has just moved lever 55 to its clockwise limit position. Under influence of the cam 31 and cam follower 62 the pivot point 60 moves between the solid line position shown in the drawing and the dotted line position 60A. With the first pivot 71 effective, as shown in the drawing, the lever 55 rocks or arcuately moves so that pivot 59 reciprocates between the full line position shown and dotted line position 59A. This reciprocates the rack 56 to cause partial arcuate movement of pinion 57 and hence partial arcuate movement of the winding tube 40. The sequence of movement is that cam 32 first moves winding tube 40 upwardly through slots 18, then the lever 55 rocks to the intermediate limit position 86, the cam 32 causes the winding tube 40 to move downwardly through the slots 21, and the cam 31 causes the lever 55 to return to the full line position. This is a cyclical winding movement in a first path to wind the coils 52 and 53. After a predetermined number of cycles, the counter 35 times out and trips the latch 82 so that the second pivot 72 becomes effective. The shifter mechanism operates during the time that the wire guide means 28 is travelling on the common portion of the two winding paths, which is when the lever 55 is at its clockwise limit position 85, and when pinion 57 and the wire guide means 28 are at a single common arcuate limit. At this time the first pivot pin 71 is aligned with the pivot hole 74 and the first bearing 76, and also the second pivot pin 72 is aligned with the second pivot hole 75 and the second bearing 77. This simultaneous alignment permits the shifting of pivots to be done whether it is such as to make the second pivot 72 effective or whether it is the return shifting movement which renders the first pivot 71 effective.

The first coils 52 and 53 have now been wound by the preceding movements and, without stopping, the machine 11 may continue to wind full pitch coils such as coils 13 and 23 until the counter 35 again times out to stop the drive means 34 by means of the switch 102. The full pitch coils are wound by the wire guide means 28 travelling in a second path of cyclical movements which has a common path portion with the first path so as to form the common coil side 26. The cam 31 acts on the cam follower 62 the same as before for this second winding path, and the pivot 60 moves between the same full line and dotted line positions. However, with the lever 55 now pivoted at pivot 72, this has changed the effective throw of the lever 55 because it is a change of force transmitting points at different distances relative to pivots of the lever 55. The lever 55 thus moves to its counterclockwise limit position 87 to move the rack 56 farther than before and thus giving greater arcuate movement to the winding tube 40. This makes this tube travel up through one slot 18 and downwardly through the next adjacent slot 18 rather than downwardly through the slot 21. This second winding path movement thus winds full pitch coils on the winding form shown as the stator 15.

FIGURE 2 shows a modification of the winding machine 11 of FIGURE 1 wherein a lever 155 replaces lever 55. This lever 155 has an extension 154 carrying the cam follower 62, and this extension 154 replaces the link 54 in the embodiment of FIGURE 1. With this modification the pivot 60 is not required nor is the fork 61 and slot 63, because the extension 154 is rigidly connected to lever 155. The cam 31 will again act on the cam follower 62 to rock the lever 155 in its arcuate movements, and thus the operation of FIGURE 2 will result in similar first and second winding paths of relative movement of the wire guide means 28 and winding form 15.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A winding machine comprising, in combination, a frame, wire guide means carried on said frame to conduct a wire to a form, first and second cam means rotatable in synchronism relative to said frame, linking means connecting said first cam means to relatively arcuately move said wire guide means and said form about an axis, pivot means included in said linking means, means connecting said second cam means to relatively reciprocate said wire guide means and said form along said axis and hence to provide a composite cyclic winding path movement caused by both said cam means, a shifter mechanism including first and second alternatively operable pivot pins acting as force transmitting points at different distances relative to said pivot means to change the effective arcuate relative movement of said wire guide means and said form to provide cyclical relative movement in first and second different winding paths, and drive means to rotate both said cam means.

2. A winding machine comprising, in combination, a frame, wire guide means carried on said frame to conduct a wire to a form, first and second cam means rotatable in synchronism relative to said frame, linking means connecting said first cam means to relatively arcuately move said wire guide means and said form about an axis, means connecting said second cam means to relatively reciprocate said wire guide means and said form along said axis and hence to provide a composite cyclic winding path movement caused by both said cam means, a shifter mechanism including first and second pivot means in said linking means to change the effective arcuate relative movement of said wire guide means and said form to provide cyclical relative movement in first and second different winding paths with a common portion, means to shift said shifter mechanism at a time of relative travel on said common portion of said first and second paths, and drive means to rotate both said cam means whereby a first coil is wound on said form and then a second coil is wound.

3. A winding machine comprising, in combination, a frame, wire guide means to conduct wires to a form, a lever, first pivot means pivotally connecting said lever to said frame, means including second pivot means providing relative arcuate movement of said wire guide means and said form in accordance with pivotal movement of said lever, first cam means, cam follower means including third pivot means connected to rock said lever to relatively arcuately move said wire guide means and said form about a first axis, second cam means synchronized with said first cam means to relatively reciprocate said wire guide means and said form along said axis and hence to provide a composite cyclic winding path movement caused by both said cam means, a shifter mechanism including first and second pivots for one of said first, second, and third pivot means to change the effective throw of said lever to thus cause said wire guide means and said form to relatively cyclically move in first and second different winding paths with a common portion, a counter connected to count winding cycles, means responsive to a predeterminable number of cycles counted by said counter to shift said shifter mechanism at a time when said wire guide means and said form are relatively travelling on said common portion of said first and second paths, and drive means to rotate both said cam means whereby a first coil is wound on said form by said wire guide means for said predetermined number of cycles and then a second coil is wound.

4. A winding machine comprising, in combination, a frame, wire guide means carried on said frame to conduct wires, first and second cam means rotatable in synchronism relative to said frame, linking means including pivot means and connecting said first cam means to said wire guide means to arcuately move said guide means about a first axis, means connecting said second cam means to said guide means to reciprocate said guide means along said axis and hence to give to said guide means a composite cyclic winding path movement caused by both said cam means, a shifter mechanism including first and second alternatively operable pivot pins acting as force transmitting points at different distances relative to said pivot means to change the effective arcuate throw of said guide means to thus cause said guide means to cyclically move in first and second different winding paths, and drive means to rotate both said cam means.

5. A winding machine comprising, in combination, a frame, wire guide means carried on said frame to conduct wires, first and second cam means rotatable in synchronism relative to said frame, linking means connecting said first cam means to said wire guide means to arcuately move said guide means about a first axis, means connecting said second cam means to said guide means to reciprocate said guide means along said axis and hence to give to said guide means a composite cyclic winding path movement caused by both said cam means, a shifter mechanism including first and second alternatively effective pivot means in said linking means, means to establish said first and second pivot means alternatively effective to change the effective arcuate throw of said guide means to thus cause said guide means to cyclically move in first and second different winding paths, and drive means to rotate both said cam means whereby a first coil may be wound by said guide means with said first pivot means effective and then a second different size coil may be wound with said second pivot means effective.

6. A winding machine comprising, in combination, a frame, wire guide means carried on said frame to conduct wires, first and second cam means rotatable in synchronism relative to said frame, linking means connecting said first cam means to said wire guide means to arcuately move said guide means about a first axis, means connecting said second cam means to said guide means to reciprocate said guide means along said axis and hence to give to said guide means a composite cyclic winding path movement caused by both said cam means, a shifter mechanism including first and second pivot means in said linking means to change the effective arcuate throw of said guide means to thus cause said guide means to cyclically move in first and second different winding paths with a common portion, means to shift said shifter mechanism at a time when said guide means is travelling on said common portion of said first and second paths, and drive means to rotate both said cam means whereby a first coil is wound by said guide means and then a second different size coil is wound.

7. A winding machine comprising, in combination, a frame, a winding tube to conduct wires, a lever, first pivot means pivotally connecting said lever to said frame, means including second pivot means providing arcuate movement of said winding tube in accordance with pivotal movement of said lever, first cam means, cam follower means including third pivot means connected to rock said lever to arcuately move said winding tube about a first axis, second cam means synchronized with said first cam means to reciprocate said winding tube along said axis and hence to give to said winding tube a composite cyclic winding path movement caused by both said cam means, and a shifter mechanism including first and second pivots for one of said first, second, and third pivot means to change the effective throw of said lever to thus cause said winding tube to cyclically move in first and second different winding paths with a common portion, whereby first and second coils with a common coil side may be wound by said winding tube by shifting said shifter mechanism at a time when said winding tube is travelling on said common portion of said first and second paths.

8. A winding machine comprising, in combination, a frame, a winding tube to conduct wires, a lever, first pivot means pivotally connecting said lever to said frame, means including second pivot means providing arcuate movement of said winding tube in accordance with pivotal movement of said lever, first cam means, cam follower means including third pivot means connected to rock said lever to arcuately move said winding tube about a first axis, second cam means synchronized with said first cam means to reciprocate said winding tube along said axis and hence to give to said winding tube a composite cyclic winding path movement caused by both said cam means, a shifter mechanism including first and second pivots for one of said first, second, and third pivot means to change the effective throw of said lever to thus cause said winding tube to cyclically move in first and second different winding paths with a common portion, a counter connected to count winding cycles, means responsive to a predeterminable number of cycles counted by said counter to shift said shifter mechanism at a time when said winding tube is travelling on said common portion of said first and second paths, and drive means to rotate both said cam means whereby a first coil is wound by said winding tube for said predetermined number of cycles and then a second coil is wound.

9. A winding machine comprising, in combination, a frame, a winding tube to conduct wires, a feed tube carrying said winding tube transversely thereto and in wire communication therewith, a lever, first pivot means pivotally connecting said lever to said frame, means including second pivot means providing arcuate movement of said winding tube in accordance with pivotal movement of said lever, first cam means to rock said lever to arcuately move said winding tube, second cam means synchronized with said first cam means to longitudinally reciprocate said feed tube and hence to give to said winding tube a composite cyclic winding path movement caused by both said cam means, a shifter mechanism including first and second pivots for one of said first and second pivot means to change the effective throw of said lever to thus cause said winding tube to cyclically move in first and second different winding paths with a common portion, a counter connected to count winding cycles, means responsive to a predeterminable number of cycles counted by said counter to shift said shifter mechanism at a time when said winding tube is travelling on said common portion of said first and second paths, and drive means to rotate both said cam means whereby a first coil is wound by said winding tube for said predetermined number of cycles and then a second coil is wound.

10. A winding machine comprising, in combination, a frame, a winding tube to conduct wires, a feed tube carrying said winding tube transversely thereto and in wire communication therewith, a lever, first pivot means pivotally connecting said lever to said frame, means including second pivot means providing pivotal movement of said feed tube in accordance with pivotal movement of said lever, a link, third pivot means pivotally interconnecting said lever and said link, first cam means to reciprocate said link and hence rock said lever to arcuately move said winding tube, second cam means synchronized with said first cam means to longitudinally reciprocate said feed tube and hence to give to said winding tube a composite cyclic winding path movement caused by both said cam means, a shifter mechanism including first and second pivots for one of said first, second, and third pivot means to change the effective throw of said lever to thus cause said winding tube to cyclically move in first and second different winding paths with a common portion, a counter connected to count winding cycles, means responsive to a predeterminable number of cycles counted by said counter to shift said shifter mechanism at a time when said winding tube is travelling on said common portion of said first and second paths, and drive means to rotate both said cam means whereby a first coil is wound by said winding tube for said predetermined number of cycles and then a second coil is wound.

11. A winding machine comprising, in combination, a frame, a winding tube to conduct wires, a feed tube carrying said winding tube generally perpendicular thereto and in wire communication therewith, a pinion slidably keyed to said feed tube and journalled for rotation relative to said frame, means journalling said feed tube for longitudinal reciprocatory movements through said pinion, a reciprocable rack carried on said frame and meshing with said pinion to arcuately rotate same upon reciprocation of said rack, a lever, first pivot means pivotally connecting said lever to said frame, second pivot means pivotally interconnecting said lever and said rack, a link, third pivot means pivotally interconnecting said lever and said link, first cam means to reciprocate said link and hence rock said lever to arcuately move said winding tube, second cam means synchronized with said first cam means to longitudinally reciprocate said feed tube and hence to give to said winding tube a composite cyclic winding path movement caused by both said cam means, a shifter mechanism including first and second pivots for one of said first, second, and third pivot means to change the effective throw of said lever to thus cause said winding tube to cyclically move in first and second different winding paths with a common portion, a counter connected to count winding cycles, means responsive to a predeterminable number of cycles counted by said counter to shift said shifter mechanism at a time when said winding tube is travelling on said common portion of said first and second paths, and drive means to rotate both said cam means whereby a first coil is wound by said winding tube for said predetermined number of cycles and then a second coil is wound.

12. A winding machine comprising, in combination, a frame, means for mounting on said frame a stator to be wound, a winding tube to conduct a wire to said stator in first and second winding paths to wind first and second partially overlapping coils on said stator with a single common coil side, a feed tube carrying said winding tube generally perpendicular thereto and in wire communication therewith, means to supply wire to said feed tube, a pinion slidably keyed to said feed tube and journalled for rotation relative to said frame, means journalling said feed tube for longitudinal reciprocatory movements through said pinion, a reciprocable rack carried on said frame and meshing with said pinion to arcuately rotate same upon reciprocation of said rack, a lever, first pivot means pivotally connecting said lever to said frame, second pivot means pivotally interconnecting said lever and said rack, a link, third pivot means pivotally interconnecting said lever and said link, first cam means to reciprocate said link and hence rock said lever to arcuately move said winding tube, second cam means synchronized with said first cam means to longitudinally reciprocate said feed tube and hence to give to said winding tube a composite cyclic winding path movement caused by both said cam means, a shifter mechanism including first and second pivots for said first pivot means to change the effective throw of said lever to thus cause said winding tube to cyclically move in first and second different and partially overlapping winding paths with a common portion, means to shift said shifter mechanism at a time when said winding tube is travelling on said common portion of said first and second paths, and drive means to rotate both said cam means whereby said first coil is wound by said winding tube and then said second coil is wound.

13. A winding machine for winding consecutively first and second coils having only one common coil side, said winding machine comprising, in combination, a frame, a carrier mounted on said frame and movable into first and second positions, first and second pivots carried by said carrier, a lever, said carrier in said first position establishing said first pivot interengaging said lever to permit a first pivot condition of said lever relative to said frame, said carrier in said second position establishing said second pivot interengaging said lever at another location to permit a second pivot condition of said lever relative to said frame, a first cam operatively connected to reciprocatively pivot said lever in each of said first and second pivot conditions for first and second different arcuate movements, respectively, of said lever, said first arcuate movement being between a first and a second arcuate limit and said second arcuate movement being between said first and a third arcuate limit, wire guide means connected to said lever to partake of movements corresponding to said first and second different arcuate movements, a second cam to reciprocate said wire guide means transversely of said arcuate movements thereof, and motive means to rotate said cams and operable to shift said carrier between said first and second positions with said lever at said first arcuate limit to wind first and second coils with said first and second coils having only a single common coil side.

14. A winding machine for winding consecutively first and second coils having only one common coil side, said winding machine comprising, in combination, a frame, a yoke pivotable on said frame into first and second positions, first and second pivot pins carried by said yoke, a lever having first and second pivot holes near a first end thereof, said yoke in said first position establishing said first pivot pin in said first pivot hole to permit a first pivot condition of said lever relative to said frame, said yoke in said second position establishing said second pivot pin in said second pivot hole to permit a second pivot condition of said lever relative to said frame, a first cam operatively connected to said lever to reciprocatively pivot said lever in each of said first and second pivot conditions for first and second different arcuate movements, respectively, of said lever, said first arcuate movement being between a first and a second arcuate limit and said second arcuate movement being between said first and a third arcuate limit, a feed tube, means linking said tube to said lever to partake of said first and second arcuate movements, a second cam to reciprocate said feed tube longitudinally, and motive means to rotate said cams and operable to shift said yoke between said first and second positions with said lever at said first arcuate limit to wind first and second coils with said first and second coils having only a single common coil side.

15. A winding machine for winding consecutively first and second coils having only one common coil side, said winding machine comprising, in combination, a frame, a carrier mounted on said frame and movable into first and second positions, first and second pivots carried by said carrier, a lever, first and second bearings in said frame, said carrier in said first position establishing said first pivot interengaging said lever and said first bearing to permit a first pivot condition of said lever relative to said frame, said carrier in said second position establishing said second pivot interengaging said lever and said second bearing to permit a second pivot condition of said lever relative to said frame, a first cam operatively connected to an intermediate point of said lever, to reciprocatively pivot said lever in each of said first and second pivot conditions for first and second different arcuate movements, respectively, of said lever, said first arcuate movement being between a first and a second arcuate limit and said second arcuate movement being between said first and a third arcuate limit, a feed tube carried in said frame for sliding and rotative movement, means linking said feed tube and said lever to communicate the arcuate movements of said lever to said feed tube, a second cam to reciprocate said feed tube longitudinally, a winding tube carried by said feed tube for combined movements of said cams, and motive means to rotate said cams and operable to shift said carrier between said first and second positions with said lever at said first arcuate limit to wind first and second coils with said first and second coils having only a single common coil side.

16. A winding machine for winding consecutively first and second coils having only one common coil side, said winding machine comprising, in combination, a frame, a yoke pivotable on said frame into first and second positions, first and second pivot pins carried by said yoke, a lever having first and second pivot holes near a first end thereof, first and second bearings in said frame, said yoke in said first position establishing said first pivot pin in said first pivot hole and in said first bearing to permit a first pivot condition of said lever relative to said frame, said yoke in said second position establishing said second pivot pin in said second pivot hole and in said second bearing to permit a second pivot condition of said lever relative to said frame, a rack pivoted to a second end of said lever, a pinion rotated by said rack, a first cam operatively connected to an intermediate point of said lever to reciprocatively pivot said lever in each of said first and second pivot conditions for first and second different arcuate movements, respectively, of said pinion, said first arcuate movement being between a first and a second arcuate limit and said second arcuate movement being between said first and a third arcuate limit, a feed tube slidingly keyed to said pinion for rotative movement therewith, a second cam to reciprocate said feed tube longitudinally, a winding tube carried by said feed tube for combined movements of said cams, and motive means to rotate said cams and operable to shift said yoke between said first and second positions with said pinion at said first arcuate limit to wind first and second coils with said first and second coils having only a single common coil side.

References Cited in the file of this patent
UNITED STATES PATENTS 2,632,602    Weis _____ Mar. 24, 1953
2,770,424    Grove _____ Nov. 13, 1956